United States Patent
Yi et al.

(10) Patent No.: US 8,712,379 B2
(45) Date of Patent: Apr. 29, 2014

(54) AUTHENTICATING MESSAGES SENT BETWEEN A VEHICLE AND A CENTRAL FACILITY

(75) Inventors: Ki Hak Yi, York (CA); Kenneth L. Peirce, Grosse Pointe Park, MI (US); Andrew J. MacDonald, Grosse Pointe Park, MI (US); Sethu K. Madhavan, Erie, PA (US)

(73) Assignee: General Motors LLC, Detroit, MI (US)

( * ) Notice: Subject to any disclaimer, the term of this patent is extended or adjusted under 35 U.S.C. 154(b) by 164 days.

(21) Appl. No.: 13/323,303

(22) Filed: Dec. 12, 2011

(65) Prior Publication Data

US 2013/0149998 A1    Jun. 13, 2013

(51) Int. Cl.
H04M 1/66    (2006.01)
H04M 1/68    (2006.01)
H04M 3/16    (2006.01)
H04L 29/06   (2006.01)
H04W 4/00    (2009.01)

(52) U.S. Cl.
USPC ........ 455/411; 455/414.3; 455/433; 705/14.4

(58) Field of Classification Search
USPC ............. 455/411, 414.3, 433; 705/1, 14, 14.4
See application file for complete search history.

(56) References Cited

U.S. PATENT DOCUMENTS

| | | | |
|---|---|---|---|
| 2004/0242230 A1* | 12/2004 | Rue ............................... | 455/433 |
| 2006/0003753 A1* | 1/2006 | Baxter, Jr. ................... | 455/414.3 |
| 2008/0040138 A1* | 2/2008 | Hinz et al. ......................... | 705/1 |
| 2008/0133368 A1* | 6/2008 | Spolar et al. .................... | 705/14 |
| 2012/0035993 A1* | 2/2012 | Nangia ........................ | 705/14.4 |
| 2013/0149998 A1* | 6/2013 | Yi et al. ......................... | 455/411 |

* cited by examiner

Primary Examiner — William D Cumming
(74) Attorney, Agent, or Firm — Anthony Luke Simon; Reising Ethington P.C.

(57) ABSTRACT

A system and method for transmitting short message service (SMS) messages between a vehicle and a central facility includes determining an authentication tone having a unique characteristic, generating an SMS message that includes computer-readable data representing the authentication tone; sending the SMS message to a central facility, establishing a call between the central facility and the vehicle using a vehicle telematics unit and a wireless carrier system, generating the determined authentication tone at the vehicle, and transmitting the generated authentication tone over the established call to the central facility.

20 Claims, 2 Drawing Sheets

AUTHENTICATING MESSAGES SENT BETWEEN A VEHICLE AND A CENTRAL FACILITY

TECHNICAL FIELD

The present invention relates generally to vehicles and more particularly to authenticating messages that are sent between the vehicle and the central facility.

BACKGROUND OF THE INVENTION

Vehicle manufacturers outfit their vehicles with an increasing number of wireless communications capabilities. Telematics units installed in modern vehicles can wirelessly communicate both voice and data communications between the vehicle and a variety of recipients, such as a central facility, over a wireless carrier network. The increased number of vehicles and other devices that can wirelessly communicate has created a corresponding increase in the number of communications, such as short-message service (SMS) messages. Given the increased number of communications, at least some messages from these sources may be unwanted by a recipient. And when protecting against spoofing or other attacks it can be challenging to determine which SMS messages have been sent from trusted senders and which messages have not.

SUMMARY OF THE INVENTION

According to an aspect of the invention, there is provided a method of transmitting short message service (SMS) messages between a vehicle and a central facility. The method includes determining an authentication tone having a unique characteristic; generating an SMS message that includes computer-readable data representing the authentication tone; sending the SMS message to a central facility; establishing a call between the central facility and the vehicle using a vehicle telematics unit and a wireless carrier system; generating the determined authentication tone at the vehicle; and transmitting the generated authentication tone over the established call to the central facility.

According to another aspect of the invention, there is provided a method of transmitting SMS messages between a vehicle and a central facility. The method includes receiving at a central facility an SMS message that is sent from one of a plurality of vehicles and that includes computer-readable data representing an authentication tone having a unique characteristic; receiving a call from one of the vehicles at the central facility via a wireless carrier system; detecting an authentication tone that is transmitted via the received call from one of the vehicles; comparing the detected authentication tone with the computer-readable data representing the authentication tone that is included with the SMS messages; and validating the SMS message if the detected authentication tone matches the computer-readable data.

According to yet another aspect of the invention, there is provided a method of transmitting SMS messages between a vehicle and a central facility. The method includes specifying at a vehicle an authentication tone having a randomly-chosen frequency, a number of tone pulses, and a time delay between each tone pulse; generating an SMS message that includes computer-readable data representing the randomly-chosen frequency, the number of tone pulses, and the time delay; sending the SMS message from the vehicle to a central facility via a wireless carrier system; establishing a call between the vehicle and the central facility via the wireless carrier system; transmitting the authentication tone from the vehicle to the central facility using the established call; detecting the frequency of the authentication tone, the number of tone pulses, and the time delay between each tone pulse received at the central facility; comparing the results of step (f) with the computer-readable data of the SMS message; and validating the SMS message if the computer-readable data matches the results of step (f).

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

The system and method described below involve transmitting SMS messages between a vehicle and a central facility in such a way that the central facility can determine the identity of the SMS message sender. By determining the sender's identity, the central facility can more efficiently determine if the SMS message it received is from a sender that it wants to receive information from. If not, the SMS message can be deleted without dedicating significant resources to determine the content of that SMS message and/or open the computing resources of the central facility to malicious content that can be included in unwanted SMS messages.

In the past, the central facility could ask vehicles to confirm their identity to the facility via a phone call during which a mobile dialed number (MDN) of a vehicle telematics unit can be interpreted by the central facility (e.g. using caller ID) or by transmitting the MDN of the vehicle over the phone call as dual tone multiple frequency (DTMF) tones. However, some networks in which the vehicle can travel may not support technology that is capable of transmitting the MDN via caller ID. Additionally, DTMF tones can be incorrectly received from the vehicle or can be misinterpreted as feature code controls in the wireless network. The receipt and interpretation of DTMF tones can also consume significant amounts of time.

Instead, an authentication tone having a particular frequency can be selected at a vehicle. This particular frequency can be included with an SMS message as computer-readable code and sent to the central facility. In addition to sending the SMS message having the computer-readable code, the vehicle can call the central facility and generate the authentication tone at the particular frequency specified in the SMS message. The generated authentication tone can be received at the central facility which then detects the particular frequency of the tone. When the central facility receives SMS messages, computer-readable data representing particular frequencies that are included with those messages can be compared to the particular detected frequency. If there is a match, the vehicle that generated the authentication tone having the particular frequency can be identified as the sender of the SMS message that includes that frequency as computer-readable data.

In other embodiments, additional authenticating elements can be determined at the vehicle and transmitted to the central facility via SMS message as computer-readable data and via telephone call. For example, in addition to the particular frequency of the authentication tone, the number of times that tone is generated can be specified as well as an amount of time between the transmission of each authentication tone.

Figure 1:
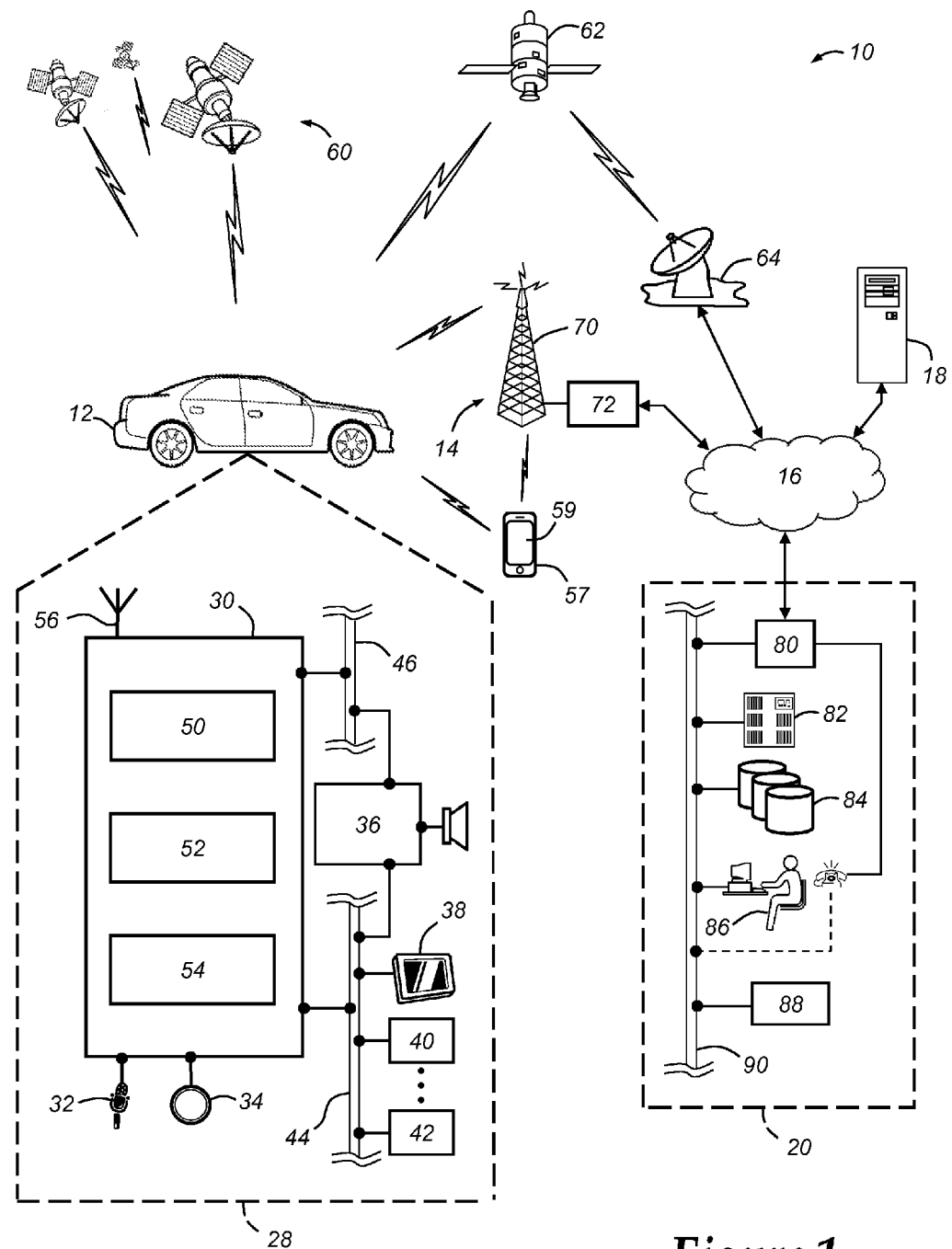
FIG. 1 is a block diagram depicting an exemplary embodiment of a communications system that is capable of using the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Cellular system 14 can implement any suitable communications technology, including for example, analog technologies such as AMPS, or the newer digital technologies such as CDMA (e.g., CDMA2000), 1XRTT, 1XEVDO, GSM, GPRS, EDGE, WCDMA, and HSPA to name a few. And it should be apparent that the methods and systems described herein can be used with any of these examples of communications technology. Each cell tower 70 includes sending and receiving antennas and a base station, with the base stations from different cell towers being connected to the MSC 72 either directly or via intermediary equipment such as a base station controller. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
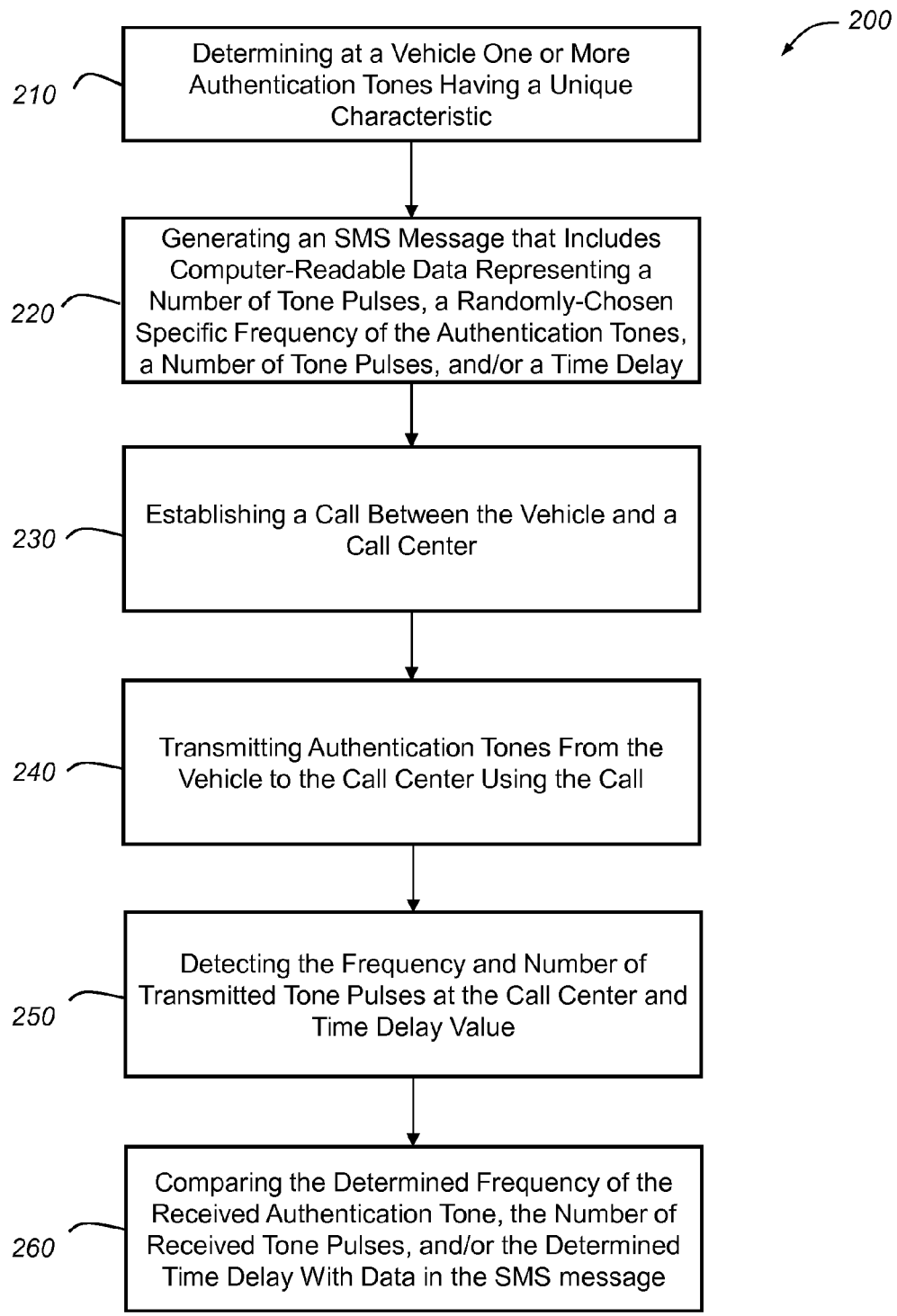
FIG. 2 is a flow chart of a method of operating a telematics unit.

Turning now to FIG. 2, there is a method 200 of transmitting short message service (SMS) messages between a vehicle 12 and a central facility. The method 200 begins at step 210 by determining at the vehicle 12 one or more authentication tones having a unique characteristic, such as a specific frequency, a tone pulse length, a number of tone pulses, or a time delay value between multiple tone pulses. The authentication tone can be a specific frequency that is randomly-chosen chosen for recognition by the central facility, such as the call center 20. In this embodiment, the central facility will be described using the call center 20. It should also be appreciated that the method 200 can also involve only determining an authentication tone having one frequency and a single tone pulse, as well as a plurality of tone pulses having one frequency that are separated by time delays of a particular value. The frequency of the authentication tone can be constant and chosen at the vehicle 12, such as by the telematics unit 30, when an SMS message is sent by the vehicle 12.

In some cases, the authentication tone can be a single tone pulse having a specific frequency. However, it is possible to decrease the possibility of more than one vehicle 12 choosing a single tone pulse having the same frequency by increasing the number of tone pulses of the authentication tone that the vehicle 12 determines (e.g. chooses). In this case, not only is the frequency randomly chosen but so is the number of times (e.g. pulses) the authentication tone having that frequency is generated. For example, as the number of vehicles 12 expected to send SMS messages increases, the vehicle 12 or the call center 20 can decide that the number of frequencies available for authentication tones may not sufficiently represent that number of vehicles 12. In that case, additional tone pulses can be determined at the vehicle 12. Or in other words, more than one vehicle can use an authentication tone having the same frequency and each vehicle 12 can be identified by the number of tone pulses it chooses. For instance, two vehicles 12 can use the same frequency for an authentication tone, but those vehicles 12 can be distinguished from each other based on the number of tone pulses each vehicle 12 determines. In one example, one vehicle can choose one authentication tone having a particular frequency while another vehicle can choose the same frequency but decide to send two tone pulses. So, even though different vehicles 12 are choosing the same frequency, the call center 20 can distinguish them based on the number of tone pulses chosen by the vehicle 12.

The call center 20 can also determine the number of tone pulses that the vehicle 12 can determine or choose. Depending on the number of vehicles 12 that can send SMS messages to the central facility, such as call center 20, it is possible that the call center 20 can direct the vehicles 12 to use a defined number of tone pulses. For example, given a range or number of frequencies available to be used as unique characteristics for tone pulses, the number of vehicles that the call center 20 can expect to receive SMS messages from and the average number of SMS messages received at the call center 20 for each vehicle, it is possible to specify the number of tone pulses each vehicle 12 should choose.

The use of variable time delay values can also increase the possible number of uniquely identifying combinations. In addition to the choice of frequency and number of tone pulses, each tone pulse can be separated by a determined amount of time (if multiple tone pulses are used). The amount of time delay can be a value that is randomly-selected at the vehicle 12 and can be used to identify the vehicle 12 along with the frequency of the authentication tone and/or the number of tone pulses that are chosen. The method 200 proceeds to step 220.

At step 220, an SMS message is generated that includes computer-readable data representing the number of tone pulses, the randomly-chosen specific frequency of the authentication tones, the number of tone pulses, and/or the time delay between the pulses at the vehicle 12. The vehicle 12 can send the SMS message from the vehicle 12 to the call center 20 via the wireless carrier system 14. The call center 20 can receive the SMS message from one of a plurality of vehicles 12. The SMS message can be generated at the vehicle 12 by the telematics unit 30 and sent, via the wireless carrier system 14, to call center 20 using techniques known in the art. However, the SMS message generated at the vehicle 12 can be created to include computer-readable data that can identify to the call center 20 the chosen frequency of the authentication tone and if multiple tone pulses are used, how many tone pulses will be used, and the time delay between the tone pulses. The computer-readable data can be a set of data or commands that can be interpreted as or converted into language that is automatically recognizable and/or readable by a computer, such as computer 18, that is either located at or accessible by the call center 20. It is possible to incorporate the computer-readable data into the SMS message in a variety of ways. For example, the computer-readable data can be placed in the header portion of the SMS message. Or in another example, the computer-readable data can be included with the payload of the SMS message. Regardless of the location of the computer-readable data, it should be appreciated that the computer-readable data can take many forms, such as binary or hexadecimal code as well as ASCII characters, which can be decoded and read by a computer to represent the frequency of the authentication tones, the number of tone pulses, and/or the time delay between pulses. The method 200 proceeds to step 230.

At step 230, a call is established between the vehicle 12 and the call center 20 via the wireless carrier system 14. This call can be initiated by the vehicle 12 after the vehicle 12 has sent the SMS message to the central facility (e.g. call center 20). In one example, this call can be a circuit-switched call and use the voice channel of that call to communicate the with the call center 20. The call can be automatically generated based on the sending of an SMS message. Other implementations are possible, but the call should be able to communicate authentication tone(s) from the vehicle 12 to the call center 20 in such a way that the frequency at which those tones were generated can be detected by the call center 20. The method 200 proceeds to step 240.

At step 240, the authentication tones are transmitted from the vehicle 12 to the call center 20 using the established call, wherein each tone pulse is separated by the time delay value. The authentication tones can be generated using equipment carried by the vehicle 12 and then wirelessly sent using the wireless carrier system 14. The vehicle 12 can carry equipment capable of generating authentication tones at a particular (or chosen) frequency that can be communicated over the established call. In one example, the authentication tone can be generated using equipment similar to that which can generate a DTMF tone. Or the authentication tone can be generated by the same equipment used to generate a DTMF tone. In one example, this equipment can be resident on the telematics unit 30. It is possible for the telematics unit 30 to audibly play the authentication tone over the established call at a particular frequency, which can then be received and detected at the call center 20. When more than one tone pulse is transmitted from the vehicle 12 to the call center 20, the call center 20 can count the number of tone pulses the vehicle 12 transmits as well as recording the amount of time in between the transmitted tone pulses. The method 200 proceeds to step 250.

At step 250, the frequency and number of transmitted tone pulses received at the call center 20 are detected as well as the time delay value between the received tone pulses. Once the call center 20 receives the authentication tone via the established call, the call center 20 can detect the frequency of the tone (or tone pulses) using techniques known in the art. Once the call center 20 receives or detects the frequency of an authentication tone, the call center 20 can stand by to determine if more than one tone pulse will be received from the vehicle 12. The call center 20 can start a timer at the end of the first tone pulse it receives. If more than one tone pulse is sent from the vehicle 12, then the timer can be stopped when the second tone pulse is received at the call center 20 from the vehicle 12. The amount of time between the end of the first tone pulse and the beginning of the second tone pulse can be determined to be the time delay value. On the other hand, if only one tone pulse is sent from the vehicle 12 and received at the call center 20, the timer that was started at the end of the first received tone pulse can expire after a predetermined amount of time if no other tone pulse is received at the call center 20. The method 200 proceeds to step 260.

At step 260, the determined frequency of the received authentication tone, the number of received tone pulses, and/or the determined time delay value are compared with computer-readable data of the SMS message. The SMS message received at the call center 20 is validated if the computer-readable data matches the determined frequency, number of transmitted tone pulses, and/or time delay value. Earlier in the method 200, the vehicle 12 sent the SMS message that included computer-readable data representing the frequency of an authentication tone (and optionally the number of tone pulses and/or the time delay value) to the call center 20. The call center 20 can automatically read/interpret the computer-readable data to determine the values of frequency, number of tone pulses, and/or the time delay value. This data can be saved in the database 84 in order to search for the frequency, number of tone pulses, and/or time delay value in received computer-readable data when the call is established between the call center 20 and the vehicle 12. So, when the frequency of the authentication tone sent over the call is determined or the number of tone pulses or the time delay value is determined, the call center 20 can compare those determined values with the values that were received via computer-readable data from the SMS messages. Using software and computer resources to carry out data searches that can compare data for matches, the call center 20 can locate any SMS messages that contain frequency values, number of tone pulses, and time delay values that match those generated by the vehicle 12 and received at the call center 20 via the call. If that occurs, the call center 20 can identify the SMS message that included those values as computer-readable data and associate the vehicle 12 that sent the authentication tones with SMS message it sent. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of transmitting short message service (SMS) messages between a vehicle and a central facility, comprising the steps of:
    (a) determining an authentication tone having a unique characteristic;
    (b) generating an SMS message that includes computer-readable data representing the authentication tone;
    (c) sending the SMS message to a central facility;
    (d) establishing a call between the central facility and the vehicle using a vehicle telematics unit and a wireless carrier system;
    (e) generating the determined authentication tone at the vehicle; and
    (f) transmitting the generated authentication tone over the established call to the central facility.

2. The method of claim 1, wherein the unique characteristic further comprises one or more of a specific frequency, a tone pulse length, a number of tone pulses, or a time delay between pulses.

3. The method of claim 2, further comprising the step of randomly selecting the specific frequency at the vehicle.

4. The method of claim 1, further comprising the steps of:
   receiving at the central facility the transmitted authentication tone;
   comparing the received authentication tone with the computer readable data; and
   validating the SMS message based on the comparison.

5. The method of claim 2, further comprising the steps of determining at the central facility the number of tone pulses the authentication tone can include; and sending a value representing the number of tone pulses to the vehicle from the central facility.

6. The method of claim 1, wherein the authentication tone uniquely identifies the vehicle from other vehicles.

7. The method of claim 1, wherein step (b) further comprises including the computer-readable data representing the authentication tone in the header or payload of the SMS message.

8. The method of claim 2, wherein step (b) further comprises including a value in the computer-readable data that represents the number of tone pulses and the time delay between pulses.

9. The method of claim 1, further comprising the step of automatically establishing the call between the central facility and the vehicle based on step (c).

10. The method of claim 1, further comprising the step of generating the authentication tone using equipment on the vehicle that is capable of generating a dual tone multiple frequency (DTMF) tone.

11. A method of transmitting short message service (SMS) messages between a vehicle and a central facility, comprising the steps of:
    (a) receiving at a central facility an SMS message that is sent from one of a plurality of vehicles and that includes computer-readable data representing an authentication tone having a unique characteristic;
    (b) receiving a call from one of the vehicles at the central facility via a wireless carrier system;
    (c) detecting an authentication tone that is transmitted via the received call from one of the vehicles;
    (d) comparing the detected authentication tone with the computer-readable data representing the authentication tone that is included with the SMS messages; and
    (e) validating the SMS message if the detected authentication tone matches the computer-readable data.

12. The method of claim 11, wherein the unique characteristic further comprises one or more of a specific frequency, a tone pulse length, a number of tone pulses, or a time delay between pulses.

13. The method of claim 11, wherein the SMS message further comprises computer-readable data identifying the unique characteristic as a specific frequency, a tone pulse length, a number of tone pulses, or a time delay between pulses.

14. The method of claim 11, further comprising the steps of determining at the central facility the number of tone pulses the authentication tone can include and sending a value representing the number of tone pulses to the vehicle from the central facility.

15. The method of claim 11, further comprising the step of including computer-readable data that represents the unique characteristic in the header or payload of the SMS message.

16. The method of claim 13, wherein the computer-readable data includes a value representing the number of tone pulses and the time delay between pulses.

17. The method of claim 11, further comprising the step of detecting the frequency of the authentication tone using equipment at the central facility that is also used to detect a dual tone multiple frequency (DTMF) tone.

18. A method of transmitting short message service (SMS) messages between a vehicle and a central facility, comprising the steps of:
    (a) specifying at a vehicle an authentication tone having a randomly-chosen frequency, a number of tone pulses, and a time delay between each tone pulse;
    (b) generating an SMS message that includes computer-readable data representing the randomly-chosen frequency, the number of tone pulses, and the time delay;
    (c) sending the SMS message from the vehicle to a central facility via a wireless carrier system;
    (d) establishing a call between the vehicle and the central facility via the wireless carrier system;
    (e) transmitting the authentication tone from the vehicle to the central facility using the established call;
    (f) detecting the frequency of the authentication tone, the number of tone pulses, and the time delay between each tone pulse received at the central facility;
    (g) comparing the results of step (f) with the computer-readable data of the SMS message; and
    (h) validating the SMS message if the computer-readable data matches the results of step (f).

19. The method of claim 18, wherein the authentication tone uniquely identifies the vehicle from other vehicles.

20. The method of claim 18, further comprising the steps of determining at the central facility the number of tone pulses and sending a value representing the number of tone pulses to the vehicle from the central facility.

* * * * *